US007813605B2

(12) United States Patent
Mumm

(10) Patent No.: US 7,813,605 B2
(45) Date of Patent: *Oct. 12, 2010

(54) DATA COMMUNICATION CABLE COMPRISING FILLING MATRIX AND METHOD OF FABRICATION

(75) Inventor: Jeffrey H. Mumm, Marietta, GA (US)

(73) Assignee: Superior Essex Communications, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/384,745

(22) Filed: Apr. 7, 2009

(65) Prior Publication Data

US 2009/0196558 A1 Aug. 6, 2009

Related U.S. Application Data

(63) Continuation of application No. 11/717,805, filed on Mar. 14, 2007, now Pat. No. 7,577,329.

(51) Int. Cl.
*G02B 6/44* (2006.01)

(52) U.S. Cl. ...................................... 385/100; 385/109

(58) Field of Classification Search ....................... None
See application file for complete search history.

(56) References Cited

U.S. PATENT DOCUMENTS

| | | | | |
|---|---|---|---|---|
| 4,826,278 | A | 5/1989 | Gartside et al. | |
| 5,841,072 | A | 11/1998 | Gagnon | |
| 6,374,023 | B1 | 4/2002 | Parris | |
| 6,760,523 | B2 | 7/2004 | Nechitailo | |
| 7,193,155 | B2 | 3/2007 | McMillan et al. | |
| 7,577,329 | B2 * | 8/2009 | Mumm | 385/100 |
| 2001/0019649 | A1 | 9/2001 | Field et al. | |
| 2006/0124342 | A1 | 6/2006 | Clark | |
| 2008/0105449 | A1 | 5/2008 | Kenny et al. | |
| 2008/0181564 | A1 * | 7/2008 | Overton et al. | 385/109 |

* cited by examiner

*Primary Examiner*—Sung H Pak
(74) *Attorney, Agent, or Firm*—King & Spalding

(57) ABSTRACT

A data communication cable can comprise multiple pairs of twisted conductors. A jacket that extends along the outside surface of the cable can define a longitudinal core, internal to the cable. The conductor pairs can be disposed in the core of the cable along with a foam matrix or a porous filler, with the matrix and the conductors occupying essentially all of the volume of the core. The foam matrix can hold each conductor pair in a respective location within the cable core to control signal crosstalk on each pair. A co-extrusion process can produce the cable via simultaneously extruding the foam matrix and the jacket. A pulling apparatus can feed the conductor pairs though respective ports of an extrusion head-and-die assembly. As one extruder encases the moving conductor pairs in the foam matrix, another extruder forms the jacket over the matrix and the embedded conductors.

31 Claims, 4 Drawing Sheets

DATA COMMUNICATION CABLE COMPRISING FILLING MATRIX AND METHOD OF FABRICATION

CROSS REFERENCE TO RELATED APPLICATIONS

This application is a continuation of and claims priority to U.S. patent application Ser. No. 11/717,805, filed Mar. 14, 2007 in the name of Mumm and entitled "Data Communication Cable Comprising Filling Matrix and Method of Fabrication," now U.S. Pat. No. 7,577,329, the entire contents of which are hereby incorporated herein by reference.

FIELD OF THE INVENTION

The present invention relates to communication cables with unshielded twisted pair conductors and more specifically to the mechanical positioning of the pairs within the cable by the use of a filling matrix extruded within the outer jacket of the cable.

BACKGROUND

As the desire for enhanced communication bandwidth escalates, transmission media need to convey information at higher speeds while maintaining signal fidelity and avoiding crosstalk. However, undesired effects such as noise, interference, crosstalk, alien crosstalk, NEXT (near end cross talk), ANEXT (alien NEXT), and INEXT (internal NEXT) can strengthen with increased data rates, thereby degrading signal quality or integrity. For example, when two cables are disposed adjacent one another, data transmission in one cable can induce signal problems in the other cable via crosstalk interference. Also, one twisted pair within a single cable can induce signal problems in another twisted pair within the same cable via crosstalk.

High speed twisted pair cables, such as Cat6+ cables or 10 Gbps cables, may incorporate additional features to mitigate crosstalk. One example is an internal filler, cross filler, or cross web that can maintain fixed separations between the conductor pairs within the cable. A second example is non-conventional outer jacketing that employs finned or lobed inner jacket surfaces to maintain fixed spacing between the conductor pairs and the outer jacket of the cable. Such cable features may make the cable larger, heavier, or more expensive. Added material used in larger cross fillers or lobed outer jackets may also impact burn characteristics of the cable. Furthermore, use of a filler adds manufacturing steps. The conventional manufacturing method is to extrude a cross filler type pair separator in a first step, attach copper pairs to the cross filler in a second step, and then jacket the assembly in a third step.

Accordingly, there are needs in the art for high speed communication cables that are increasingly resistant to crosstalk at data rates approaching and exceeding 10 Gpbs, do not require additional manufacturing steps, and do not unnecessarily add material structure to the cable for the internal positioning of the twisted pair conductors.

SUMMARY

The present invention supports a data cable comprising twisted pair conductors embedded within a low density matrix compound and covered with a conventional jacket compound. The matrix, or filler matrix, can maintain the position of the twisted pair conductors within the cable, for example as a cross filler or a lobed jacket may function. The matrix and outer jacket compounds may be applied in a single co-extrusion step thereby removing two or more steps from the manufacturing process.

Since the filler material, or filler matrix, may be applied in-line with the outer jacket, the filler matrix can be of very low tensile strength. For example, the filler matrix can be a highly foamed structure that is capable of positioning the twisted pairs within the cable while adding very little additional material to the cable. That is, a highly foamed or very low density filler matrix can require much less total material than structures such as cross fillers and lobed jacket surfaces while still providing the intended separation and relative positioning of the twisted pair conductors within the cable. Minimizing the addition of material structure to the cable can reduce material costs, inflexibility, weight, handling costs, and may provide for lower flame and smoke values for the cable.

In one aspect of the present invention, the filler matrix can maintain an asymmetrical positioning of the conductors within the cable. Such a filler matrix can maintain separation between two or more pairs of conductors within the cable that is greater than the separation maintained between other pairs of conductors within the same cable. Asymmetric separation of pairs of conductors within a cable can reduce INEXT, or NEXT between pairs within a cable, by increasing the separation between two or more pairs that impart heightened INEXT signal degradation upon one another. That is, if two pairs of conductors are particularly susceptible to pair-to-pair crosstalk or INEXT, the filler matrix can function to selectively increase separation between those two pairs, thereby reducing the crosstalk.

In one aspect of the present invention, the filler material can be extruded adjacent to the internal surface of the outer jacket to create a foam lined jacket. Such a foam lined jacket can be used to jacket the conductor pairs of the cable. The conductor pairs within such a foam lined jacket may, or may not, be assembled around a cross-filler. The outer jacket and the foam lining can be supplied in one step using a co-extrusion process that extrudes the jacket and the highly foamed lining simultaneously. Such a foam lined jacket may serve as an alternative to forming the outer jacket with fins, lobes, or ribs on its inner surface. Since the foam can be a lower density than the lobes of the outer jacket, less total material can be employed. Like the lobes/fins/ribs within the outer jacket, the foam lining can position the conductor pairs away from the outside jacket of the cable. Positioning the conductor pairs away from the outside jacket of the cable may reduce ANEXT, or NEXT between neighboring cables.

The discussion of extruded filler matrix materials for use in data communication cables presented in this summary is for illustrative purposes only. Various aspects of the present invention may be more clearly understood and appreciated from a review of the following detailed description of the disclosed embodiments and by reference to the drawings and the claims that follow. Moreover, other aspects, systems, methods, features, advantages, and objects of the present invention will become apparent to one with skill in the art upon examination of the following drawings and detailed description. It is intended that all such aspects, systems, methods, features, advantages, and objects are to be included within this description, are to be within the scope of the present invention, and are to be protected by the accompanying claims.

Figure 1:
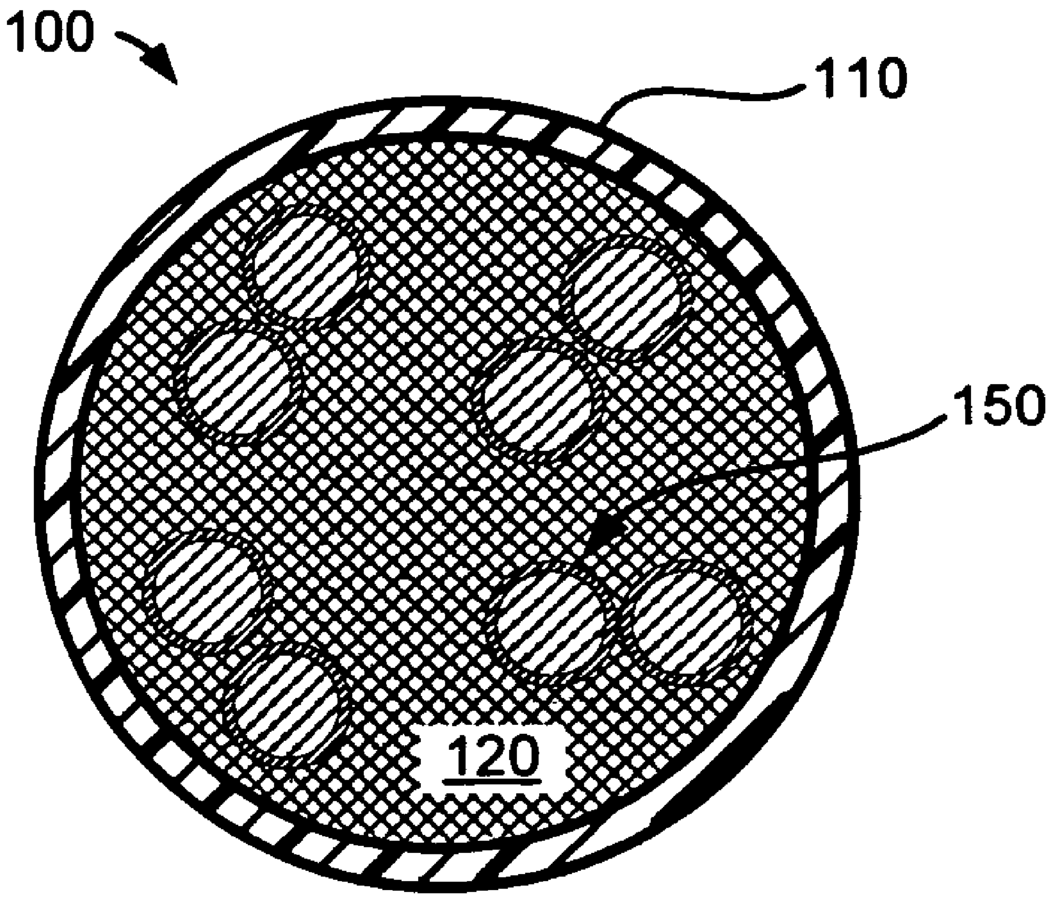
FIG. 1 illustrates a cross-sectional view of a communication cable with a filler matrix and four pairs of insulated conductors according to one exemplary embodiment of the present invention.

Many aspects of the invention can be better understood with reference to the above drawings. The elements and features shown in the drawings are not to scale, emphasis instead being placed upon clearly illustrating the principles of exemplary embodiments of the present invention. Moreover, certain dimensions may be exaggerated to help visually convey such principles. In the drawings, reference numerals designate like or corresponding, but not necessarily identical, elements throughout the several views.

DETAILED DESCRIPTION OF EXEMPLARY EMBODIMENTS

The present invention supports a cable used to communicate data or other information. The cable can comprise multiple pairs of twisted conductors and an outer jacket that extends along the outside surface of the cable defining a longitudinal core, internal to the cable. The conductor pairs can be disposed in the core of the cable along with a foam matrix or a porous filler, with the matrix and the conductors occupying essentially all of the volume of the core. The foam matrix can hold each conductor pair in a respective location within the cable core to control signal crosstalk on each pair. A co-extrusion process can produce the cable via simultaneously extruding the foam matrix and the jacket. A pulling apparatus can draw the conductor pairs through respective port tubes of an extrusion head-and-die assembly. A first extruder can encase the moving conductor pairs in the foam matrix while a second extruder can form outer cable jacket over the matrix and the embedded conductors.

In one exemplary embodiment, the cable can be formed with the matrix and the conductors occupying essentially all of the volume of the core. The foam matrix can hold each conductor pair in a respective location within the cable core to control signal crosstalk on each pair. That is, the conductor pairs can be positioned within the cross-section of the cable during the extrusion process and held in position by the foamed filler matrix. The positions of the conductors can be either symmetrical or asymmetrical. That is, the pairs may be equally spaced from one another, or two pairs may be closer to one another than two other pairs. Additionally, one pair may positioned differently than any of the other pairs. Such asymmetric spacing may reduce cross-talk, internal cross-talk or INEXT. The filler matrix may also reduce cross-talk, alien cross-talk, or ANEXT by positioning the conductive pairs away from the outer jacket and hence away from neighboring cables.

In one exemplary embodiment, the cable can be formed with the foamed matrix lining the inside surface of the outer jacket and providing a void within the foam lining. The conductors of the cable being positioned within the void. Such a foam lined jacket may be extruded around pairs of conductors alone or also around pairs of conductors that are positioned around a traditional cross filler element. Alternatively, the cross filler may be an asymmetrical cross-filler to position the conductor pairs asymmetrically around the inside of the cable. Such asymmetric positioning may reduce internal cross-talk or INEXT. The foam lining may reduce alien cross-talk or ANEXT by positioning the conductive pairs away from the outer jacket and hence away from neighboring cables.

In one exemplary embodiment, the cable or some other similarly noise mitigated cable can meet a transmission requirement for "10 G Base-T data com cables." In one exemplary embodiment, the cable or some other similarly noise mitigated cable can meet the requirements set forth for 10 Gbps transmission in the industry specification known as TIA 568-B.2-10 and/or the industry specification known as ISO 11801.

Exemplary cables comprising a foamed filler matrix will now be described more fully hereinafter with reference to FIGS. 1-4, which describe representative embodiments of the present invention.

The invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "exemplary embodiments" given herein are intended to be non-limiting, and among others supported by representations of the present invention.

Turning now to FIG. 1, this figure illustrates a cross-sectional view of a communication cable 100 with a filler matrix 120 and four pairs of insulated conductors 150 according to one exemplary embodiment of the present invention. Eight insulated conductors 150 can be formed into four twisted pairs of insulated conductors. A foam filler matrix 120 can be formed around the conductive pairs 150. An outer jacket 110 can be formed around the foam filler matrix 120.

The outer jacket 110 can seal the cable 100 from the environment and provide strength and structural support. The outer jacket 110 can be characterized as an outer sheath, a jacket, a casing, or a shell. The outer jacket 110 can be extruded or pultruded and can be formed of plastic, rubber, PVC, polymer, polyolefin, polyethylene, acrylic, modified ethylene-CTFE (under the trademark VATAR), silicone, urethane, or other insulator, for example.

The foam filler matrix 120 can function to position the conductors 150 at specific locations within the cross-section of the cable 100. As some examples, the conductors 150 can be positioned randomly, evenly, symmetrically, or asymmetrically. Furthermore, the conductors can be intentionally positioned with a space between the conductors and the outer jacket 110. Depending upon the application, the filer matrix 120 can be made of flame retardant polyethylene (FRPE), flame retardant polypropylene (FRPP), PVC, or fluoropolymers. In other examples, the filler matrix 120 can be formed of plastic, rubber, polymer, polyolefin, polyethylene, acrylic, modified ethylene-CTFE (under the trademark VATAR), silicone, urethane, other insulator, or any combination thereof.

The foam filler matrix 120 maybe be highly foamed. For example, the foam filler matrix 120 may be 75% expanded or that filler matrix 120 may be 50 to 80 percent expanded. A high level of foaming (in other words, a high percentage of expansion) may use less of the matrix material per volume to be foamed. This lower density may result in a cable of lower weight, lower material expense, and lower handling expense. The cable may also have a better flammability rating than one formed of denser materials. The filler matrix 120 foam may be an open cell foam or a closed cell foam. The material of the filler matrix 120 may be foamed by a process of gas injection, chemical foaming, or other foaming technique.

The filler matrix 120 and outer jacket 110 may be formed from incompatible materials so that they do not adhere to each other. This may provide for conventional preparation of the cable 100. For example, preparation may include splicing, or terminating the cable 100 or applying the ends or cut ends of the cable 100 into connectors, connector assemblies, panels, or wall plates. In addition to not adhering to the outer jacket 110, the filler matrix 120 may be very highly foamed and thus may be easily peeled away from the conductors 150 during preparation of the cable 100.

The illustrated grouping of the insulated conductors 150 into pairs is merely exemplary as the grouping may be into any numbers of conductors. Twisted pairs are used as an example since pairs are often used in communications applications employing common mode rejection. In common mode rejection applications, the information component of the signal can be encoded in some differential fashion such as a voltage difference between each of a pair of conductors. With the information encoded in the difference, noise affecting both of the conductors equally does not become part of the information signal. The twisting of a pair of conductors together increases the likelihood of the two conductors being exposed to substantially identical noise. Each pair of conductors can be a twisted pair that carries data at 10 Gbps, for example. The groups of conductors can each have the same twist rate (twists-per-meter or twists-per-foot) or may be twisted at different rates.

The conductors 150 can be grouped as groups of one, two, three, four, five, six, seven, eight, or more than eight conductors, for example. Also, there can be one, two, there, four, five, six, seven, eight, 16, 48, 50, 100, or any other number of total conductors 150 within the cable 100. The conductors 150 may be shielded (not shown in figure). The shielding may be all together, in groups, selectively in groups, or entirely unshielded. A non-continuous shielding may be used within the cable 100. One or more of the conductors 150 can also be optical fibers.

Figure 2:
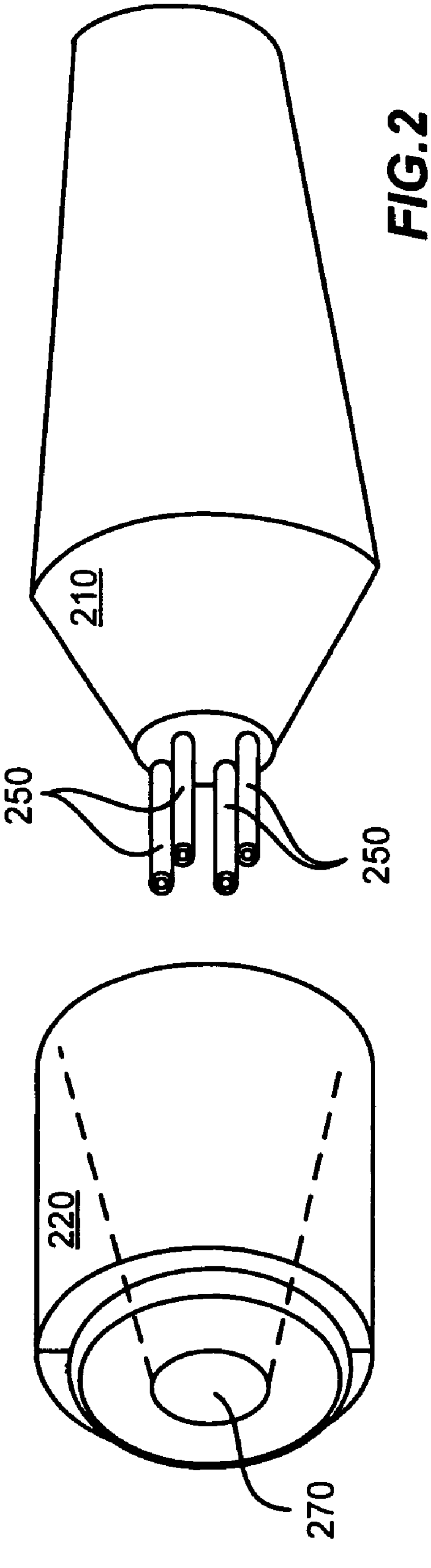
FIG. 2 illustrates an extrusion tip and die for manufacturing a cable with a filler matrix according to one exemplary embodiment of the present invention.

Turning now to FIG. 2, this figure illustrates an extrusion tip 210 and a die 220 for manufacturing a cable 100 with a filler matrix 120 according to one exemplary embodiment of the present invention. The conductors 150 of the cable 100 can be paired off and twisted separately before being fed into tubes 250. The extrusion tip 210 may be part of a conventional dual layer cross-head extrusion system. The extrusion system may incorporate two extruders feeding the cross-head. That is, a first extruder can supply the a highly foamed filler matrix 120 to be formed around the conductors 150. Similarly, a second extruder can supply a more solid material to form the outer jacket 110 around the filler matrix 120 and the conductors 150. The extruder system can comprise two nozzles or ports, one for each extrusion.

A pressure extrusion process may be employed to force the filler matrix 120 between and slightly over the conductor pairs 150. The jacketing compound may be simultaneously disposed over the matrix filler 120 to form the outer jacket 110 of the cable 100. The conductors 150 may be drawn through the conductor positioning tubes 250 and the opening 270 of the die 220 while the filler matrix 120 and the outer jacket 110 of the cable 100 are formed around them by extrusion. The drawing of the conductors 150 may be performed by a pulling apparatus down stream (in the assembly process) from the extrusion system.

Figure 3:
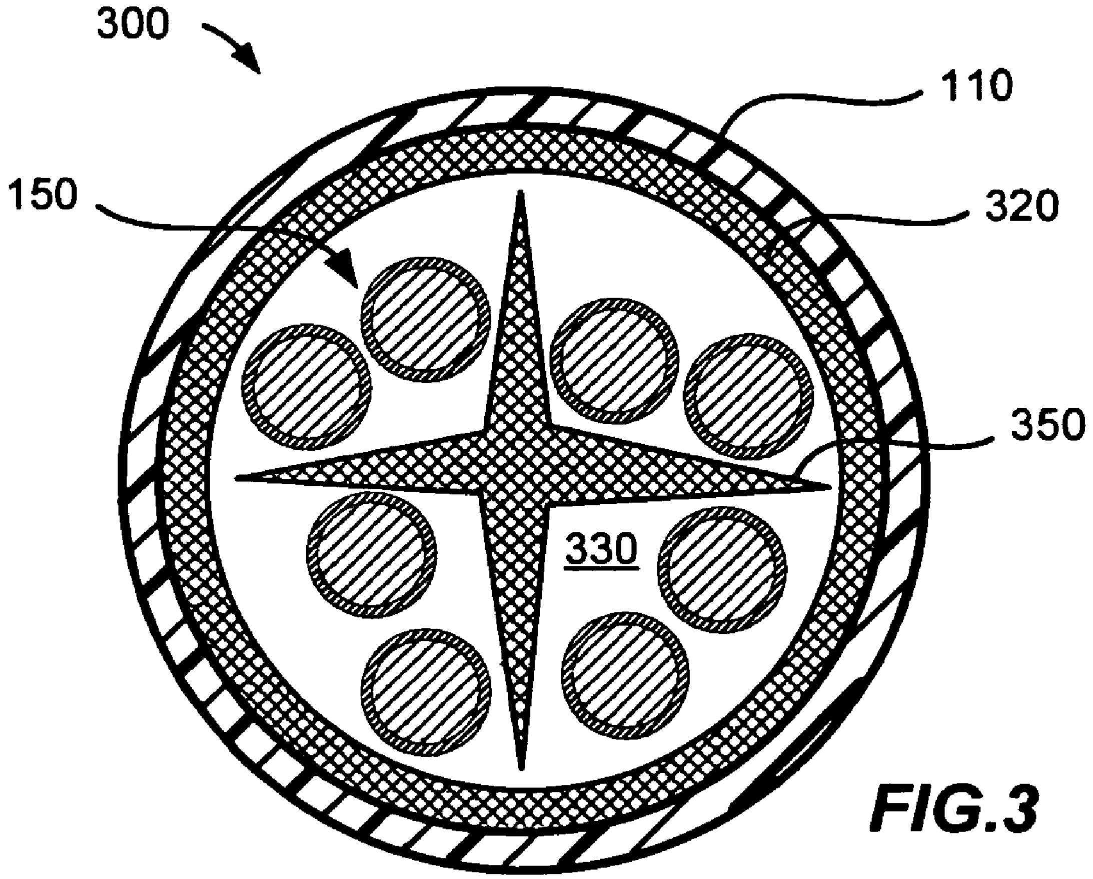
FIG. 3 illustrates a cross-sectional view of a communication cable with a foamed lining, a cross filler, and four pairs of insulated conductors according to one exemplary embodiment of the present invention.

Turning now to FIG. 3, this figure illustrates a cross-sectional view of a communication cable 300 with a foamed lining 320, a cross filler 350, and four pairs of insulated conductors 150 according to one exemplary embodiment of the present invention. The cable 300 can be formed with the foamed matrix lining 320 positioned adjacent to the inside surface of the outer jacket 110 and providing a void 330 within the foam lining. The conductors 150 of the cable 300 can be positioned within the void 330. The void 330 may contain only conductors 150 or the void 330 may contain pairs of conductors 150 that are positioned around a cross filler 350. The cross filler 350 may be symmetrical or asymmetrical. An asymmetric cross filler 350 may reduce internal cross-talk or INEXT. The foam lining 320 may reduce alien cross-talk or ANEXT by positioning the conductive pairs 150 away from the outer jacket 110 and hence away from neighboring cables.

In both the cable 300 with a foamed matrix lining 320, and a traditional cable (not illustrated) without a foam lining 320, when a cross filler 350 is used, the pairs of conductors 150 may require positioning around the cross filler 350 in a preliminary manufacturing step. This preliminary step may occur prior to the extrusion of the outer jacket 110. Because the cross filler 350 and the conductors 150 are joined in the preliminary step and then drawn together through an extruder, tensile strength requirements of the cross filler 350 may impact the possible material composition of the cross filler 350. For example, the cross filler 350 may be 35-40% expanded foam to maintain its tensile strength.

Referring again briefly to FIG. 1, the highly foamed matrix 120 may be about 75% (or more) expanded foam. In contrast to using a 35-40% expanded foam cross filler 350, the highly foamed matrix 120 may use less material and more specifically position the conductors 150 within the cable 100. Additionally, the cable 100 with a foam filler matrix 120 that substantially fills the interior of the outer jacket 110 may be manufactured in less steps than a cable having a cross filler 350.

Figure 4:
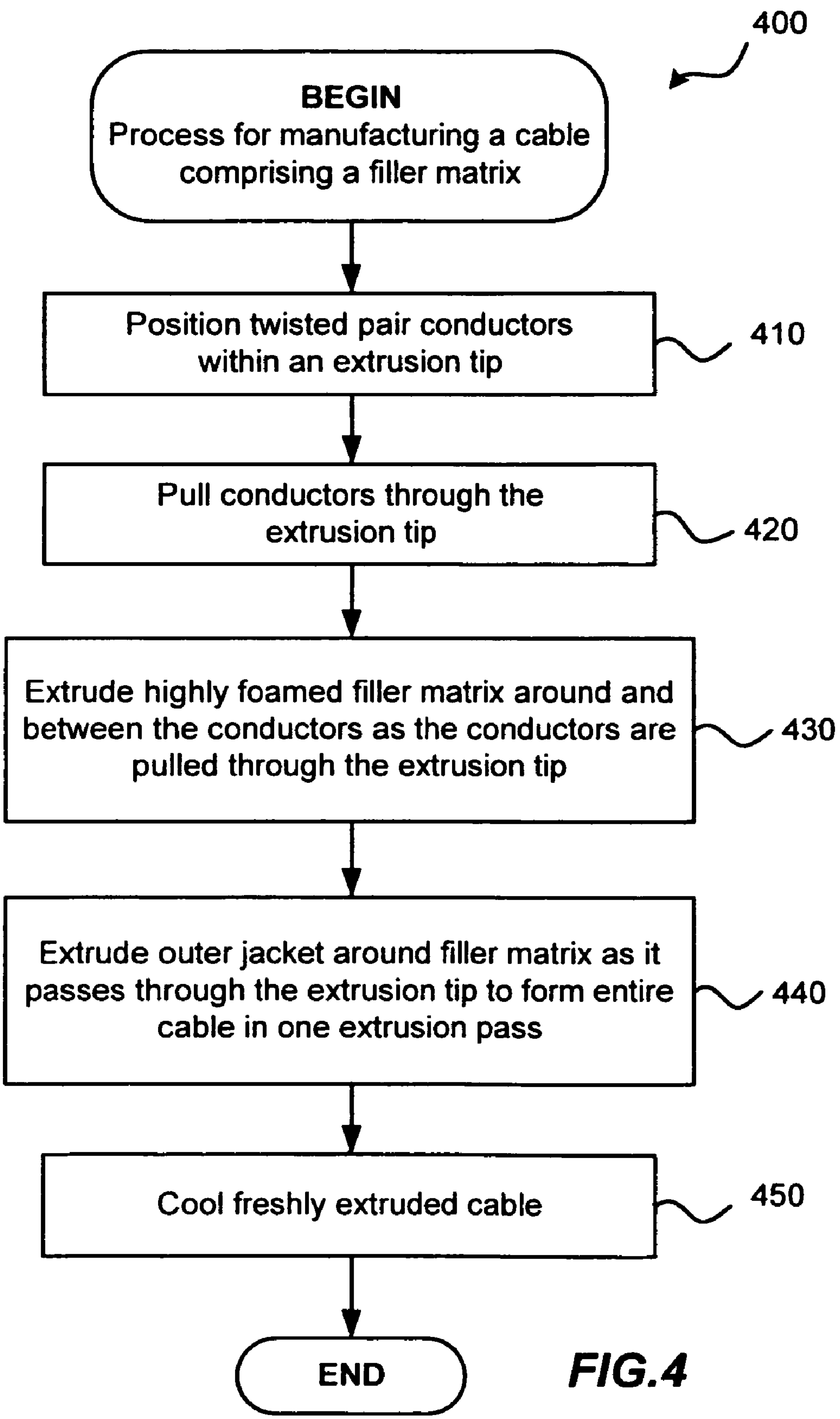
FIG. 4 illustrates a logical flow diagram of a process for manufacturing a cable with a filler matrix according to one exemplary embodiment of the present invention.

Turning now to FIG. 4, the figure shows a logical flow diagram 400 of a process for manufacturing a cable 100 with a filler matrix 120 according to one exemplary embodiment of the present invention. Certain steps in the processes or process flow described in all of the logic flow diagrams referred to below must naturally precede others for the invention to function as described. However, the invention is not limited to the order of the steps described if such order or sequence does not alter the functionality of the invention. That is, it is recognized that some steps may be performed before, after, or in parallel with other steps without departing from the scope or spirit of the invention.

In Step 410, the conductors 150 are positioned within an extrusion tip 210. The specific positions of the conductors 150 within the cable 100 can be established by the positioning of the conductor locating tubes 250 of the extrusion tip 210.

In Step 420, the conductors 150 are drawn through the extrusion tip 210. The conductors 150 may be drawn through the extruder by a pulling apparatus located downstream from the extruder.

In Step 430, a highly foamed filler matrix 120 may be extruded around and between the conductors 150 as the conductors 150 are pulled or drawn through the extrusion tip 210 and through the extrusion die 220.

In Step 440, the outer jacket 110 of the cable 100 may be extruded around the filler matrix 120 and the conductors 150 as they are drawn from the extrusion tip 210. The filler matrix 120 and the outer jacket 110 may be extruded in one single co-extrusion pass.

In Step 450, the freshly formed cable 100 (comprising the conductors 150, the foam filler 120, and the outer jacket 110) may be cooled to set the extruded materials. The process 400, while possibly run continuously, may be considered complete after Step 450.

From the foregoing, it will be appreciated that an embodiment of the present invention overcomes the limitations of the prior art. Those skilled in the art will appreciate that the present invention is not limited to any specifically discussed application and that the embodiments described herein are illustrative and not restrictive. From the description of the exemplary embodiments, equivalents of the elements shown therein will suggest themselves to those skilled in the art, and ways of constructing other embodiments of the present invention will suggest themselves to practitioners of the art. Therefore, the scope of the present invention is to be limited only by the claims that follow.

What is claimed is:

1. A communication cable comprising:

a jacket enclosing an interior volume;

a plurality of conductors extending along the cable and disposed within the interior volume; and a highly foamed material, more than about 50 percent expanded, disposed within the interior volume and substantially positioning the plurality of conductors within the interior volume, wherein the highly foamed material and the plurality of conductors substantially fill the interior volume.

2. The communication cable of claim 1, wherein the positioning of the plurality of conductors comprises an asymmetric positioning within the interior volume.

3. The communication cable of claim 1, wherein the plurality of conductors comprises a plurality of twisted pairs of insulated electrical conductors.

4. The communication cable of claim 3, wherein a portion of the highly foamed material substantially separates the plurality of twisted pairs of insulated electrical conductors from an interior surface of the jacket.

5. The communication cable of claim 3, wherein a portion of the highly foamed material substantially separates the plurality of twisted pairs of insulated electrical conductors from one another.

6. The communication cable of claim 1, wherein the highly foamed material is less than about 80 percent expanded.

7. The communication cable of claim 1, wherein the highly foamed material is about 75 percent expanded.

8. The communication cable of claim 1, wherein the highly foamed material comprises closed cell foam.

9. The communication cable of claim 1, wherein the highly foamed material comprises open cell foam.

10. A cable comprising:

an exterior jacket comprising an interior surface;

a plurality of signal conductors extending along the cable and circumscribed by the interior surface; and a foamed material, more than about fifty percent expanded, extending lengthwise along the cable and substantially adjoining the interior surface and the plurality of signal conductors, wherein the plurality of signal conductors are substantially embedded in the foamed material.

11. The cable of claim 10, wherein the foamed material substantially separates the interior surface from the plurality of signal conductors.

12. The cable of claim 10, wherein the foamed material separates at least a segment of one of the signal conductors from the interior surface.

13. The cable of claim 10, wherein the plurality of signal conductors comprises a plurality of twisted pairs of individually insulated electrical conductors.

14. The cable of claim 13, wherein the foamed material maintains the twisted pairs in a predetermined orientation that is operative to mitigate crosstalk or signal interference.

15. The cable of claim 13, wherein the foamed material is operative to maintain the plurality of twisted pairs in a predetermined configuration.

16. The cable of claim 10, wherein the plurality of conductors comprises one or more optical fibers.

17. The cable of claim 10, further comprising a cross filler circumscribed by the exterior jacket and disposed between two of the plurality of signal conductors.

18. A communication cable comprising:

a jacket defining an interior volume;

a plurality of twisted pairs of insulated electrical conductors disposed in the interior volume; and a foamed material, expanded to at least about 50 percent, substantially contacting the jacket and the plurality of twisted pairs and substantially eliminating lengthwise extending voids from the interior volume.

19. The communication cable of claim 18, wherein the foamed material is expanded to at least about 75 percent.

20. The communication cable of claim 18, wherein the foamed material is expanded to between about 50 percent and 80 percent.

21. The communication cable of claim 18, wherein the foamed material is operative to maintain the plurality of twisted pairs in an orientation selected to mitigate crosstalk.

22. The communication cable of claim 18, wherein the foamed material orients the plurality of twisted pairs with respect to one another for crosstalk management.

23. A cable comprising:

a jacket defining an interior volume;

a first twisted pair of individually insulated conductors disposed in a first quadrant of the interior volume;

a second twisted pair of individually insulated conductors disposed in a second quadrant of the interior volume;

a third twisted pair of individually insulated conductors disposed in a third quadrant of the interior volume;

a fourth twisted pair of individually insulated conductors disposed in a fourth quadrant of the interior volume; and a material, foamed to at least about 50 percent, disposed in and substantially filling each of the first, second, third, and fourth quadrants.

24. The cable according to claim 23, wherein the material contacts the jacket and each of the first, second, third, and fourth twisted pairs.

25. The cable according to claim 23, wherein the material is operative to maintain the first, second, third, and fourth twisted pairs in a predefined orientation providing preferential crosstalk performance.

26. The cable according to claim 23, wherein the material is foamed to less than about 80 percent.

27. The cable of claim 10, wherein the foamed material substantially fills a core of the cable.

28. The cable of claim 10, wherein the foamed material substantially coats the interior surface and the plurality of signal conductors.

29. The communication cable of claim 18, wherein the foamed material substantially fills an annulus formed between the plurality of twisted pairs of insulated electrical conductors and the jacket.

30. The communication cable of claim 18, wherein the plurality of twisted pairs of insulated electrical conductors are embedded in the foamed material.

31. The communication cable of claim 23, wherein the first twisted pair, the second twisted pair, the third twisted pair, and the fourth twisted pairs are embedded in the material.

* * * * *